(12) United States Patent
Fukushima et al.

(10) Patent No.: US 11,201,322 B2
(45) Date of Patent: Dec. 14, 2021

(54) ELECTRODE ACTIVE MATERIAL FOR NONAQUEOUS SECONDARY BATTERY, AND METHOD FOR MANUFACTURING SAME

(71) Applicants: TOKYO INSTITUTE OF TECHNOLOGY, Tokyo (JP); NICHIA CORPORATION, Anan (JP)

(72) Inventors: Takanori Fukushima, Meguro-ku (JP); Yoshiaki Shoji, Meguro-ku (JP); Hiroaki Takahashi, Yokohama (JP); Takefumi Sumitomo, Anan (JP); Akihiro Tokai, Yokohama (JP)

(73) Assignees: TOKYO INSTITUTE OF TECHNOLOGY, Tokyo (JP); NICHIA CORPORATION, Anan (JP)

( * ) Notice: Subject to any disclaimer, the term of this patent is extended or adjusted under 35 U.S.C. 154(b) by 134 days.

(21) Appl. No.: 16/635,998

(22) PCT Filed: Jul. 24, 2018

(86) PCT No.: PCT/JP2018/027695
§ 371 (c)(1),
(2) Date: Jan. 31, 2020

(87) PCT Pub. No.: WO2019/026690
PCT Pub. Date: Feb. 7, 2019

(65) Prior Publication Data
US 2020/0176756 A1 Jun. 4, 2020

(30) Foreign Application Priority Data

Aug. 3, 2017 (JP) .............................. JP2017-150815

(51) Int. Cl.
*H01M 4/36* (2006.01)
*H01M 4/485* (2010.01)
*H01M 4/62* (2006.01)

(52) U.S. Cl.
CPC ........... *H01M 4/362* (2013.01); *H01M 4/485* (2013.01); *H01M 4/625* (2013.01); *H01M 2220/20* (2013.01)

(58) Field of Classification Search
CPC ...... H01M 4/362; H01M 4/485; H01M 4/625; H01M 2220/20; H01M 4/1391; H01M 4/366; H01M 4/131; Y02E 60/10
See application file for complete search history.

(56) References Cited

U.S. PATENT DOCUMENTS 9,564,656 B1 * 2/2017 Zhamu ................ H01M 10/054
10,008,723 B1 * 6/2018 Zhamu ................ H01M 4/366
(Continued)

FOREIGN PATENT DOCUMENTS

| JP | 2000302547 A | 10/2000 |
|----|--------------|---------|
| JP | 2002075367 A | 3/2002 |

(Continued)

*Primary Examiner* — Andrew J. Oyer
(74) *Attorney, Agent, or Firm* — Hunton Andrews Kurth LLP

(57) ABSTRACT

An electrode active material for a nonaqueous secondary battery comprising: an alkali metal-transition metal composite oxide particles, a hole-doped graphene with an anion. The electrode active material for a nonaqueous secondary battery may be manufactured by a method which includes obtaining a hole-doped graphene by bringing a graphene raw material into contact with a two-coordinate boron cation, and bringing the hole-doped graphene into contact with an alkali metal-transition metal composite oxide particle.

12 Claims, 3 Drawing Sheets

(56) References Cited

U.S. PATENT DOCUMENTS

2015/0333319 A1 11/2015 Kawamura et al.
2018/0277829 A1* 9/2018 Konishi ................ H01M 4/625

FOREIGN PATENT DOCUMENTS

| JP | 2006012433 A | 1/2006 |
| JP | 2011146390 A | 7/2011 |
| JP | 2013012496 A | 1/2013 |
| JP | 2013058495 A | 3/2013 |
| JP | 2013124965 A | 6/2013 |
| WO | 2014115670 A1 | 7/2014 |

* cited by examiner

ELECTRODE ACTIVE MATERIAL FOR NONAQUEOUS SECONDARY BATTERY, AND METHOD FOR MANUFACTURING SAME

TECHNICAL FIELD

The present disclosure relates to an electrode active material for a nonaqueous secondary battery, and a method for manufacturing the same.

BACKGROUND ART

High output characteristics are required for positive electrode active materials for nonaqueous electrolyte secondary batteries for use in large power machines such as electric vehicles. Although electric conductivity of an electrode active material layer is important for obtaining high output characteristics, it has been difficult to obtain sufficient electric conductivity from a practically used electrode active material in some cases. A conductive assistant such as acetylene black is generally mixed in an electrode active material layer in addition to the electrode active material in an attempt to improve electric conductivity; however, room for improvement remains.

In this regard, for example, in WO 2014/115670, positive electrode active material-graphene composite particles have been proposed that are secondary particles obtained by mixing a nanoparticle-size active material and graphene oxide and then reducing the graphene oxide.

SUMMARY OF THE INVENTION

Problem to be Solved by the Invention

An object of an aspect according to the present disclosure is to provide an electrode active material capable of constituting a nonaqueous secondary battery having excellent output characteristics, and a method for manufacturing the same.

Means for Solving Problem

Specific means for solving the above problems are as follows, and the present invention includes the following aspects. A first aspect provides an electrode active material for a nonaqueous secondary battery including: an alkali metal-transition metal composite oxide particle, a graphene with an anion.

A second aspect provides a method for manufacturing an electrode active material for a nonaqueous secondary battery including: obtaining a hole-doped graphene by bringing a graphene raw material into contact with a two-coordinate boron cation; and bringing the hole-doped graphene into contact with an alkali metal-transition metal composite oxide particle.

Effect of the Invention

The first aspect according to the present disclosure can provide the electrode active material capable of constituting a nonaqueous secondary battery having excellent output characteristics. The second aspect according to the present disclosure can provide the method for manufacturing the electrode active material capable of constituting a nonaqueous secondary battery having excellent output characteristics.

MODES FOR CARRYING OUT THE INVENTION

Figure 1:
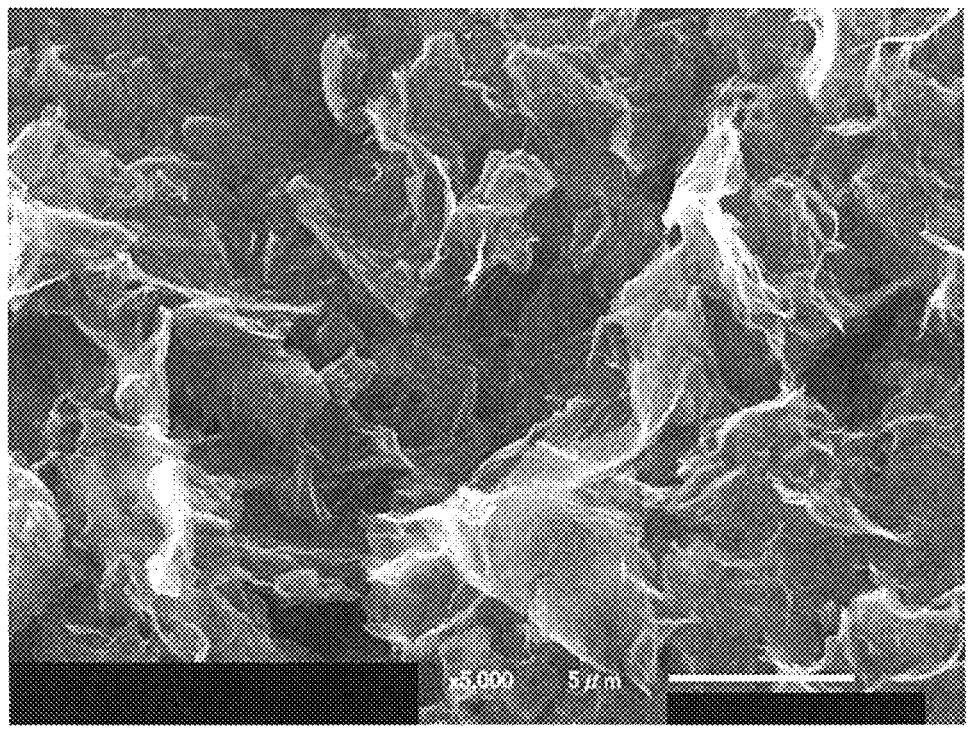
FIG. 1 is an example of a scanning electron microscope (SEM) image of a hole-doped graphene.

The term "step" as used herein includes not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified. Embodiments of the present invention will now be described in detail. It is noted that the embodiments described below are exemplification of an electrode active material for a nonaqueous secondary battery and a method for manufacturing the same for embodying the technical ideas of the present invention, and the present invention is not limited to the electrode active material for a nonaqueous secondary battery and the method for manufacturing the same described below. The members described in claims are not limited to the members of the embodiments in any way.

Electrode Active Material for Nonaqueous Secondary Battery

An electrode active material for a nonaqueous secondary battery contains alkali metal-transition metal composite oxide particles, a hole-doped graphene with an anion. The alkali metal-transition metal composite oxide particles (hereinafter also simply referred to as "composite oxide particles") are electrode active materials and have, for example, the hole-doped graphene arranged on the surface thereof, so that an electrode active material layer formed to contain these particles is improved in electric conductivity, which improves output characteristics as a nonaqueous secondary battery.

This may be considered as follows, for example. Graphene is a sheet-shaped carbonaceous material composed of $sp^2$-type carbon atoms and has excellent electric conductivity. Graphene adhering to the surface of the composite oxide particles may improve the electric conductivity between the composite oxide particles and a conductive assistant such as acetylene black contained in the electrode active material layer and may increase a conductive path area. It is considered that this may improve the electric conductivity of the electrode active material layer. It is also considered that graphene is small in weight and volume and therefore may reduce an influence on energy density of the electrode active material layer.

The graphene used for constituting the electrode active material is the graphene having hole carriers, i.e., hole-doped graphene. When hole carriers are doped into graphene, the electric conductivity may be further improved, and it is considered that exfoliation of graphene may be promoted by electrostatic repulsion between layers due to positive charges derived from the doping and may reduce the number of stacked layers of graphene to be formed. Since the circumference of the hole-doped graphene may be protected due to charge compensation by the anion contained at the time of doping, it is considered that dedoping of the hole carriers may be suppressed. Additionally, it is considered that the exfoliated hole-doped graphene may have improved dispersibility in a solvent due to the affinity to the solvent improved by the anion and may uniformly adhere to the composite oxide particle surface without mutual aggregation of the exfoliated graphene. The hole-doped graphene in this description may be, for example, a substance obtained by a manufacturing method described later, and may be isolated as a substance containing an anion in addition to carbon constituting the graphene.

The hole-doped graphene may be manufactured from a graphene raw material such as graphene or graphite by using a two-coordinate boron cation salt, for example. Details of the manufacturing method will be described later. Although graphene generally means a single-atom-thick sheet material (single-layer graphene), the hole-doped graphene in this description includes not only the single-layer graphene but also a sheet-shaped substance (graphite) in which multiple layers of single-layer graphene are stacked by intermolecular force. The number of stacked layers may be up to about 100.

The electrode active material may further contain graphene or graphite other than the hole-doped graphene. The electrode active material may further contain, for example, graphene oxide (GO), graphene obtained by reducing graphene oxide (r-GO), graphene modified with an oxygen-containing functional group such as a hydroxyl group, a carboxy group, a ketone group, and an epoxy group. Graphene oxide may be prepared by a known method such as a modified Hummers method. Reduced graphene may be prepared by heat-treating graphene oxide.

The anion constituting the electrode active material may be capable of compensating the charge of the hole-doped graphene. The anion may be, for example, an anion constituting a two-coordinate boron cation salt, or may be another anion. Examples of the other anion include compounds having an anionic group such as carboxylate ($-CO_2^-$), sulfonate ($-SO_3^-$), and phosphate ($-PO_3^-$), trifluoromethanesulfonate ($TfO^-$), polyoxometalate, and hexachloroantimonate. The anion is preferably an anion constituting a two-coordinate boron cation salt, more preferably at least one selected from the group consisting of fluorine-based anions and carborane derivatives, from the viewpoint of the dispersibility of the hole-doped graphene. If a binding material of an electrode composition described later or an electrolyte of a nonaqueous secondary battery contains a fluorine atom, fluorine-based anions are particularly preferable.

The composite oxide particles constituting the electrode active material may contain a composite oxide capable of constituting either a positive electrode or a negative electrode. Examples of the composite oxide capable of constituting a positive electrode include an alkali metal-cobalt composite oxide, an alkali metal-nickel composite oxide, an alkali metal-nickel cobalt manganese composite oxide, an alkali metal-manganese composite oxide having a spinel structure, and iron phosphate alkali metal having an olivine structure. The alkali metal may be at least one of lithium, sodium, and potassium, etc.

The composite oxide capable of constituting a positive electrode may be obtained by a known method. For example, the composite oxide may be manufactured by a manufacturing method including mixing an alkali metal compound and an oxide having a desired composition to obtain a raw material mixture and heat-treating the obtained raw material mixture. A heat-treated material obtained after a heat treatment may be subjected to a crushing treatment or may be subjected to a treatment of removing unreacted materials, by-products, etc. by washing with water etc. A dispersion treatment, a classification treatment, etc. may further be performed.

A method for obtaining the oxide having a desired composition may be a method including mixing raw material compounds (hydroxide, a carbonic acid compound, etc.) according to an intended composition and decomposing the compounds into an oxide through heat treatment, a coprecipitation method including dissolving solvent-soluble raw material compounds in a solvent, achieving precipitation of precursors according to an intended composition through temperature adjustment, pH adjustment, addition of a complexing agent, etc., and heat-treating the obtained precursors to obtain an oxide, etc.

An alkali metal-transition metal composite oxide having a layered structure such as an alkali metal-cobalt composite oxide may be preferable since a nonaqueous secondary battery having a favorable balance of charge/discharge capacities, energy density, etc. can easily be obtained. For example, an alkali metal-transition metal composite oxide having a composition represented by the following formula may be particularly preferable:

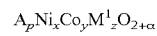

$$A_p Ni_x Co_y M^1_z O_{2+\alpha}$$

where p, x, y, z, and a satisfy $1.0 \leq p \leq 1.3$, $0 \leq x \leq 1$, $0 \leq y \leq 1$, $0 \leq z \leq 1$, $x+y+z=1$, and $-0.1 \leq \alpha \leq 0.1$, A denotes at least one selected from the group consisting of Li, Na, and K, and $M^1$ denotes at least one of Mn and Al.

Examples of the composite oxide capable of constituting a negative electrode include a lithium titanate (e.g., $Li_4Ti_5O_{12}$, $LiTi_2O_4$), a lithium titanium composite oxide (e.g., $Li_4Ti_{5-x}Mn_xO_{12}$; $0<x\leq0.3$), a lithium metal oxide (e.g., $Li_xM_yO_z$; M=Sn, Cu, Pb, Sb, Zn, Fe, In, Al, or Zr), and a lithium metal sulfide (e.g., $Li_xM_yS_z$; M=Ti, Sn, Cu, Pb, Sb, Zn, Fe, In, Al, or Zr), and in these substances, lithium may be substituted with another alkali metal. For these composite oxides, for example, matters and manufacturing methods described in Japanese Laid-Open Patent Publication Nos. 2000-302547, 2013-012496, 2013-058495, etc. (incorporated herein by reference in their entirety) may be used as appropriate.

The complex oxide particles may be doped with an element other than the elements constituting the complex oxide. Examples of the element for doping include B, Mg, Al, Si, P, S, Ca, Ti, V, Cr, Zn, Sr, Y, Zr, Nb, Mo, In, Sn, Ba, La, Ce, Nd, Sm, Eu, Gd, Ta, W, and Bi. Examples of a compound used for doping with these elements include oxides and fluorides containing at least one selected from the group consisting of these elements, and alkali metal composite oxides thereof. A doping amount may be, for example, 0.005 mol % to 10 mol % relative to the alkali metal-transition metal composite oxide particles.

The composite oxide particles may each have a core particle containing a metal composite oxide and an adhesion material disposed on a surface of the core particle. The adhesion material may be disposed in at least a partial region of the surface of the core particle and is preferably disposed in a region of 1% or more of the surface area of the core particle. The composition of the adhesion material is appropriately selected in accordance with a purpose etc., and example thereof include oxides and fluorides containing at least one selected from the group consisting of Li, B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, and alkali metal composite oxides thereof. The content of the adhesion material may be, for example, 0.03 mass % to 10 mass %, preferably 0.1 mass % to 2 mass %, in the alkali metal-transition metal composite oxide particle.

The particle diameter of the composite oxide particles may be, for example, 1 µm to 40 µm in terms of volume average particle diameter, and from the viewpoint of output characteristics, preferably 1.5 µm or more, more preferably 3 µm or more, and preferably 30 µm or less, more preferably 20 µm or less.

The content of the hole-doped graphene in the electrode active material may be, for example, 0.01 mass % or more, preferably 0.1 mass % or more, relative to the composite oxide particles from the viewpoint of electric conductivity and may be for example, 10 mass % or less, preferably 2.5 mass % or less, particularly preferably 0.5 mass % or less, relative to the composite oxide particles from the viewpoint of energy density.

In the electrode active material, at least a portion of the surface of the composite oxide particle may be covered with the hole-doped graphene. The coverage of the graphene on the surface of the composite oxide particle may be, for example, 5% to 50%, preferably 10% to 30%, relative to the surface area of the composite oxide particle.

Method for Manufacturing Electrode Active Material for Nonaqueous Secondary Battery The method for manufacturing an electrode active material for a nonaqueous secondary battery includes a first step of obtaining a hole-doped graphene by bringing a graphene raw material into contact with a two-coordinate boron cation, and a second step of bringing the hole-doped graphene into contact with alkali metal-transition metal composite oxide particles, and may further include other steps such as a separation step and a purification step as necessary.

By bringing the graphene raw material into contact with the two-coordinate boron cation, the two-coordinate boron cation extracts an electron from the graphene raw material to form a hole in the graphene raw material, and the hole-doped graphene exfoliates from the graphene raw material. The circumference of the hole-doped graphene may be protected due to charge compensation by an anion corresponding to the two-coordinate boron cation, so that the dedoping of the hole carriers may be suppressed. Additionally, the exfoliated graphene may be improved in dispersibility in a solvent due to the affinity to the solvent improved by the anion and uniformly may adhere to the composite oxide particle surface without mutual aggregation of the exfoliated graphene. As a result, the electric conductivity may be improved as the electrode active material, and it is considered that output characteristics may be improved when the material constitutes a nonaqueous secondary battery.

The graphene raw material may be a material from which the hole-doped graphene can be generated, and examples thereof include graphene, graphite, graphene oxide, reduced graphene oxide, intercalation compounds such as expanded graphite, and graphene precursors such as ABC-stacked graphite. The form of the graphene raw material may be a sheet shape or a thin leaf shape or may be a thin leaf-shaped particle such as a nanoparticle and flake-shaped particle. The graphene raw material may be selected from commercially available products or may be manufactured by a known method. For example, graphene may be manufactured by epitaxial growth, reduction of graphite oxide, generation from a metal/carbon melt, etc.

The two-coordinate boron cation is a boron cation having two boron-carbon bonds and preferably may have two aromatic rings. Examples of the aromatic rings include a phenyl group, a mesityl group, a 1,5-dimethylphenyl group, a 1,3,5-triisopropylphenyl group, a 1,5-diisopropylphenyl group, a 1,3,5-tris(trifluoromethyl)phenyl group, a 1,5-bis(trifluoromethyl)phenyl group, etc. and, from the viewpoint of hole formation, the aromatic rings may be preferably at least one selected from the group consisting of these, particularly preferably a mesityl group. The two-coordinate boron cation may have two identical aromatic rings or different aromatic rings.

The graphene raw material may be brought into contact with the two-coordinate boron cation, for example, by mixing the graphene raw material and a two-coordinate boron cation salt containing an anion. The anion forming the salt with the two-coordinate boron cation may be preferably at least one selected from the group consisting of fluorine-based anions and carborane derivatives. Examples of the fluorine-based anions include tetrafluoroborate ($BF_4^-$), hexafluorophosphate ($PF_6^-$), bis(trifluoromethanesulfonyl)imide ($TFSI^-$), tetraphenylborate, tetrakis(pentafluorophenyl)borate, etc.; at least one selected from the group consisting of these may be preferable; and tetrakis(pentafluorophenyl)borate is particularly preferable from the viewpoint of stability to a cation. Examples of the carborane derivatives include monocarba-closo-dodecaborate ($HCB_{11}H_{11}^-$), monocarba-closo-undecachlorododecaborate ($HCB_{11}Cl_{11}^-$), etc., and at least one selected from the group consisting of these may be preferable.

The two-coordinate boron cation salt may be synthesized by using a known method. For example, a dimesityl borinium cation salt [($Mes_2B^+$ ($HCB_{11}Cl_{11}^-$)] having monocarba-closo-undecachlorododecaborate as an anion may be synthesized by the following method.

Fluorodimesitylborane is added to a dry orthodichlorobenzene solution of triethylsilyl cation monocarba-closo-undecachlorododecaborate salt [$Et_3Si^+(HCB_{11}Cl_{11}^-)$] at room temperature in a glove box in which oxygen concentration and water concentration are each controlled to 0.1 ppm or less in an argon or nitrogen atmosphere and is stirred at 25° C. for 5 minutes. Under reduced pressure, a solvent is distilled away for concentration. By introducing hexane vapor into the obtained reaction mixture by a vapor diffusion method, colorless transparent crystals are precipitated. The crystals are collected by filtration and washed with dry hexane to obtain the desired two-coordinate boron cation salt [$Mes_2B^+(HCB_{11}Cl_{11}^-)$] as colorless transparent crystals.

A dimesitylborinium cation salt [$Mes_2B^+((C_6F_5)_4B^-)$] having tetrakis(pentafluorophenyl)borate as an anion may be obtained as colorless transparent crystals by using $Et_3Si^+$ [$(C_6F_5)_4B^-$], instead of $Et_3Si^+(HCB_{11}Cl_{11}^-)$, through the same operation as described above.

The graphene raw material may be brought into contact with the two-coordinate boron cation in a solvent. The solvent may be a low electron-donating solvent not reactive with the two-coordinate boron cation, and examples thereof include low-polarity aromatic organic solvents such as orthodichlorobenzene (ODCB), 1,2,4-trichlorobenzene, and mesitylene.

The graphene raw material may be brought into contact with the two-coordinate boron cation at a mass ratio of the two-coordinate boron cation salt to the graphene raw material set to, for example, 0.1 to 20, preferably 1 to 10. When a solvent is used, a mass ratio of the solvent to the graphene raw material may be set to, for example, 10 to 600, preferably 50 to 450.

The graphene raw material may be brought into contact with the two-coordinate boron cation in an atmosphere that is an inert gas atmosphere such as argon or nitrogen, for example, and the oxygen concentration may be preferably set to 5 ppm or less, for example.

The graphene raw material may be in contact with the two-coordinate boron cation, for example, at room temperature for 3 days to 15 days. For the contact between the graphene raw material and the two-coordinate boron cation, a step of applying energy may be provided as necessary. Application of energy tends to further promote the exfoliation of the hole-doped graphene. Examples of a method for applying energy include pulverization/shearing treatments etc. using microwave irradiation, heat treatment, ultrasonic treatment, submerged plasma treatment, a ball mill, a jet mill, a pressure homogenizer, supercritical treatment, etc. When energy is applied, an ionic liquid, an anionic polymer, etc. may coexist. Examples of the ionic liquid include imidazolium-based ionic liquids (see, e.g., NATURE CHEMISTRY, 7, 730-736 (2015)). Examples of the anionic polymer include poly(meth)acrylate salts (conjugate bases of poly(meth)acrylic acid), poly(styrenesulfonic acid) salts (conjugate bases of PSS), and Nafion (registered trademark). When energy is applied, an energy application time may appropriately be selected depending on the purpose of application, an application method, etc.

The first step may further include a separation step of separating desired graphene after the generation of the hole-doped graphene by bringing the graphene raw material into contact with the two-coordinate boron cation. For example, if the graphene raw material is brought into contact with the two-coordinate boron cation in a solvent, solid-liquid separation may be performed after the contact. The solid-liquid separation may be performed by filtration using a membrane filter etc. or may be performed by removing a supernatant after sedimentation of a solid content. The solid content obtained by solid-liquid separation may be subjected to a washing treatment using an organic solvent as necessary. Examples of the organic solvent used for washing include the aromatic organic solvents described above, amide-based organic solvents such as N-methyl-2-pyrrolidone (NMP), and nitrile-based organic solvents such as acetonitrile.

The first step may include an anion substitution step after the separation step. By anion substitution, the anion forming the salt with the hole-doped graphene may be substituted with an anion different from the anion of the two-coordinate boron cation salt. The anion substitution step may be performed, for example, by bringing a desired anion into contact with the hole-doped graphene in a solvent. Examples of the anion used for anion substitution include compounds having anionic groups such as carboxylate ($—CO_2^-$), sulfonate ($—SO_3^-$), and phosphate ($—PO_3^-$), trifluoromethanesulfonate ($TfO^-$), polyoxometalate, and hexachloroantimonate.

The first step may include a drying step of taking out desired graphene as a powder after the separation step or the anion substitution step and may include a redispersion step of re-dispersing the desired graphene in a desired organic solvent to obtain a dispersion liquid.

At the second step, the hole-doped graphene obtained at the first step is brought into contact with the alkali metal-transition metal composite oxide particles. The graphene may be brought into contact with the composite oxide particles by dry mixing, or by wet mixing in the presence of an organic solvent etc. In the case of dry mixing, the contact may be achieved by a mixing method using a blender, a ball mill, and a high-speed shear mixer, for example. In the case of wet mixing, the graphene and the composite oxide particles may be mixed in a desired organic solvent by using a stirring blade, a homogenizer, etc.

The graphene brought into contact with the composite oxide particles may be graphene after solid-liquid separation of the first step including the separation step or may be graphene before solid-liquid separation. If the graphene after solid-liquid separation is used, the graphene may be used as a powder or a dispersion liquid. The graphene after solid-liquid separation may be subjected to anion substitution as necessary. If the graphene before solid-liquid separation is used, a mixture after contact between the graphene raw material and the two-coordinate boron cation may be mixed with the composite oxide particles to bring the hole-doped graphene into contact with the composite oxide particles.

If the hole-doped graphene is brought into contact with the composite oxide particles by wet mixing at the second step, solid-liquid separation may be performed after the contact. The solid-liquid separation may be performed by filtration using a membrane filter etc. or may be performed by removing a supernatant after sedimentation of a solid content. If the supernatant is removed for solid-liquid separation, the removed supernatant may contain the hole-doped graphene and therefore may be reused for a treatment of the composite oxide particles. The solid content obtained by solid-liquid separation may be subjected to a washing treatment using an organic solvent as necessary and may be subjected to an anion substitution treatment as necessary.

At the second step, the hole-doped graphene and the composite oxide particles may solely be brought into contact with each other or may be mixed with at least one of the other components constituting the electrode composition described later. Moreover, a mixing ratio of the graphene and the complex oxide particles at the second step may appropriately be selected depending on a structure of the intended electrode active material.

Although specific embodiments of the method for manufacturing an electrode active material will hereinafter be illustrated, the method is not limited to these embodiments.

A first embodiment includes (1) bringing a graphene raw material into contact with a two-coordinate boron cation in a solvent to form hole carriers in the graphene raw material, (2) optionally applying energy to the mixture containing the graphene raw material, the two-coordinate boron cation, and the solvent, (3) separating and washing the hole-doped graphene, (4) optionally performing an anion substitution treatment, (5) drying the hole-doped graphene to obtain a powder or dispersing the hole-doped graphene in a solvent to obtain a dispersion, and (6) mixing the composite oxide particles and the graphene powder or dispersion.

A second embodiment includes (1) bringing a graphene raw material into contact with a two-coordinate boron cation in a solvent to form hole carriers in graphene, (2) separating and washing the hole-doped graphene, (3) applying energy to the hole-doped graphene in a solvent, (4) optionally performing an anion substitution treatment, (5) drying the hole-doped graphene to obtain a powder or dispersing the hole-doped graphene in a solvent to obtain a dispersion, and (6) mixing the composite oxide particles and the graphene powder or dispersion.

A third embodiment includes (1) bringing a graphene raw material into contact with a two-coordinate boron cation in a solvent to form hole carriers in the graphene raw material, (2) optionally applying energy to the mixture containing the graphene raw material, the two-coordinate boron cation, and the solvent, (3) mixing the hole-doped graphene and the composite oxide particles in a solvent, (4) separating through filtration and washing the composite oxide particles to which the hole-doped graphene adheres, and (5) optionally performing an anion substitution treatment.

A fourth embodiment includes (1) bringing a graphene raw material into contact with a two-coordinate boron cation in a solvent to form hole carriers in the graphene raw material, (2) optionally applying energy to the mixture containing the graphene raw material, the two-coordinate boron cation, and the solvent, (3) mixing the hole-doped graphene and the composite oxide particles in a solvent, (4) causing sedimentation of the composite oxide particles to which the hole-doped graphene adheres and recovering a supernatant containing excess graphene to obtain a sediment, and (5) optionally applying an anion substitution treatment to the sediment.

Electrode Composition for Nonaqueous Secondary Battery

An electrode composition for a nonaqueous secondary battery may contain the electrode active material described above and a binder and may further contain a conductive assistant, a filler, and/or an organic solvent, etc. as necessary.

The binder may be, for example, a material assisting adhesion between the electrode active material and the conductive assistant and adhesion of the electrode active material to a collector. Examples of the binder include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene propylene diene rubber (EPDM), sulfonated EPDM, styrene butylene rubber, fluororubber, and various copolymers, etc. The content of the binder may be, for example, 0.5 mass % to 50 mass % relative to the total mass of the electrode composition.

The conductive assistant may be a material improving the electric conductivity of the electrode active material layer, for example. The hole-doped graphene may be used as the conductive assistant, and other examples of the conductive assistant include: graphite such as natural graphite and artificial graphite; carbon black such as carbon black, acetylene black, Ketjenblack, channel black, furnace black, lamp black, and thermal black; conductive fibers such as carbon fiber and metal fiber; carbon materials such as graphene and carbon nanotube; carbon fluoride; metal powder comprising at least one of aluminum, and nickel, etc.; conductivity whiskers comprising at least one of zinc oxide, and potassium titanate, etc.; conductive metal oxide such as titanium oxide; and conductive materials such as polyphenylene derivatives. The content of the conductive assistant may be, for example, 0.5 mass % to 30 mass % relative to the total mass of the electrode composition.

The filler may be a material suppressing expansion of the electrode active material layer, for example. Examples of the filler include: lithium carbonate; olefin-based polymers such as polyethylene and polypropylene; and fibrous substances such as a glass fiber and a carbon fiber.

The electrode composition may contain an organic solvent. Examples of the organic solvent include N-methyl-2-pyrrolidone (NMP).

Electrode for Nonaqueous Secondary Battery

An electrode for a nonaqueous secondary battery may include a collector and an electrode active material layer disposed on the collector and containing the electrode active material for a nonaqueous secondary battery described above. The electrode may be manufactured by drying and pressing the electrode composition described above after being dispersed in a solvent such as NMP into a slurry and then applied onto the collector.

Examples of the collector include metals such as copper, stainless steel, aluminum, nickel, and titanium; baked carbon; composite materials that are copper and stainless steel having a surface surface-treated with carbon, nickel, titanium, silver, etc.; and an aluminum-cadmium alloy. The collector may be enhanced in adhesive force with the electrode active material layer etc. by forming fine unevenness on the surface thereof. The collector may have various forms such as a film, a sheet, a foil, a net, a porous body, a foam, and a nonwoven fabric. The thickness of the collector may be 3 µm to 500 µm, for example.

Nonaqueous Secondary Battery

A nonaqueous secondary battery may include at least one type of the electrode for a nonaqueous secondary battery. The nonaqueous secondary battery may include, in addition to the electrode for a nonaqueous secondary battery, an electrode paired with the electrode for a nonaqueous secondary battery, a nonaqueous electrolyte, a separator, etc. The paired electrode may be the electrode for a nonaqueous secondary battery. For example, materials for a nonaqueous secondary battery described in Japanese Laid-Open Patent Publication Nos. 2002-075367, 2011-146390, 2006-12433, 2000-302547, 2013-124965, and 2013-058495 (incorporated herein by reference in their entirety) may appropriately be used for the paired electrode, the nonaqueous electrolyte, the separator, etc. in the nonaqueous secondary battery.

The electrolyte described above may contain an anion having fluorine, for example. Specifically, one or more of lithium salts containing anions having fluorine, such as $LiPF_6$, $LiBF_4$, $LiSbF_6$, $LiAsF_6$, $LiSO_3CF_3$, and $LiN(SO_2CF_3)_2$ may be used.

EXAMPLE

Examples according to the present invention will hereinafter specifically be described; however, the present invention is not limited to these examples.

<Manufacturing of Hole-Doped Graphene>

In a glove box in which oxygen concentration was adjusted to 3.0 ppm or less in an argon atmosphere, 1.25 g of two-coordinate boron cation salt, $Mes_2B^+[(C_6F_5)_4B]^-$, was added to 21 mL of dry orthodichlorobenzene at room temperature and was stirred and dissolved. To this solution, 125 mg of graphene nanopowder (manufactured by EM-Japan; average flake diameter: 10 µm, flake thickness: 1.6 nm) was added as a graphene raw material, and the obtained liquid mixture was stirred at room temperature for 10 days. Stirring was performed by using a stirring bar in a sealed container. After stirring the liquid mixture, the container was kept sealed and taken out of the glove box and subjected to an ultrasonic treatment (irradiation frequency: 28 kHz, output: 110 W) for 1 hour. Subsequently, the mixture was filtrated by using a Teflon (registered trademark) membrane filter having a pore diameter of 0.1 µm while being sucked by a pump. The filtration was followed by washing with orthodichlorobenzene. The material obtained by filtration was vacuum-dried to obtain a composition G containing a hole-doped graphene.

Figure 2:
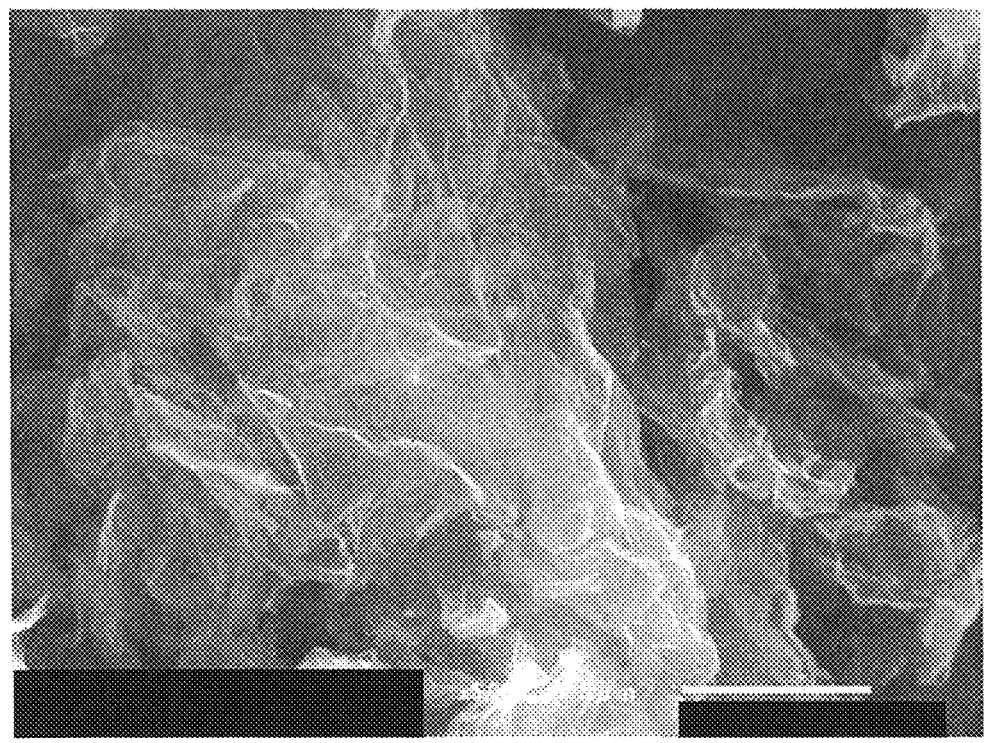
FIG. 2 is an example of an SEM image of a graphene raw material.
Figure 3:
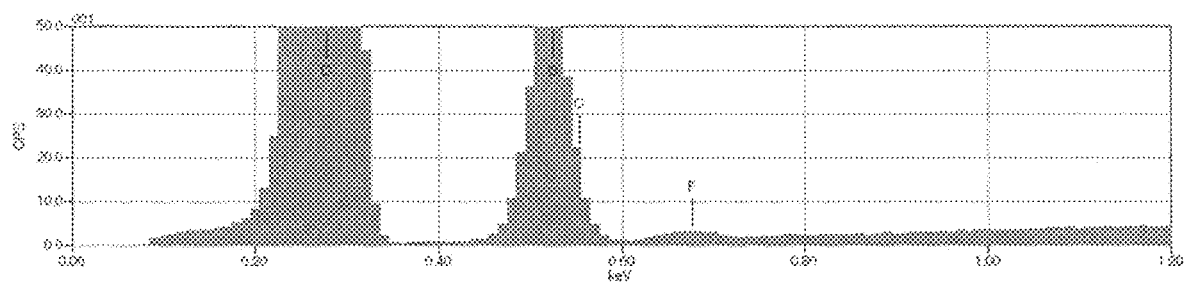
FIG. 3 is an example of energy dispersive X-ray analysis (EDX) results of the hole-doped graphene.

The obtained composition G containing the hole-doped graphene was observed with a scanning electron microscope (SEM; JEOL JSM-IT100LA; acceleration voltage: 20 kV). FIG. 1 shows an SEM image of the hole-doped graphene, and FIG. 2 shows an SEM image of the graphene raw material. The composition G containing the hole-doped graphene was subjected to energy dispersive X-ray analysis (EDX; JEOL JSM-IT100LA; acceleration voltage: 20 kV), and fluorine atoms not detected in the graphene raw material were detected at about 0.3 atom % relative to a detected amount of carbon atoms. An EDX chart is shown in FIG. 3. It is considered that the detected fluorine atoms are derived from an anion of the two-coordinate boron cation salt and that the anion is a counter anion compensating the charge of the hole-doped graphene.

Manufacturing of Positive Electrode

Example 1

Figure 4:
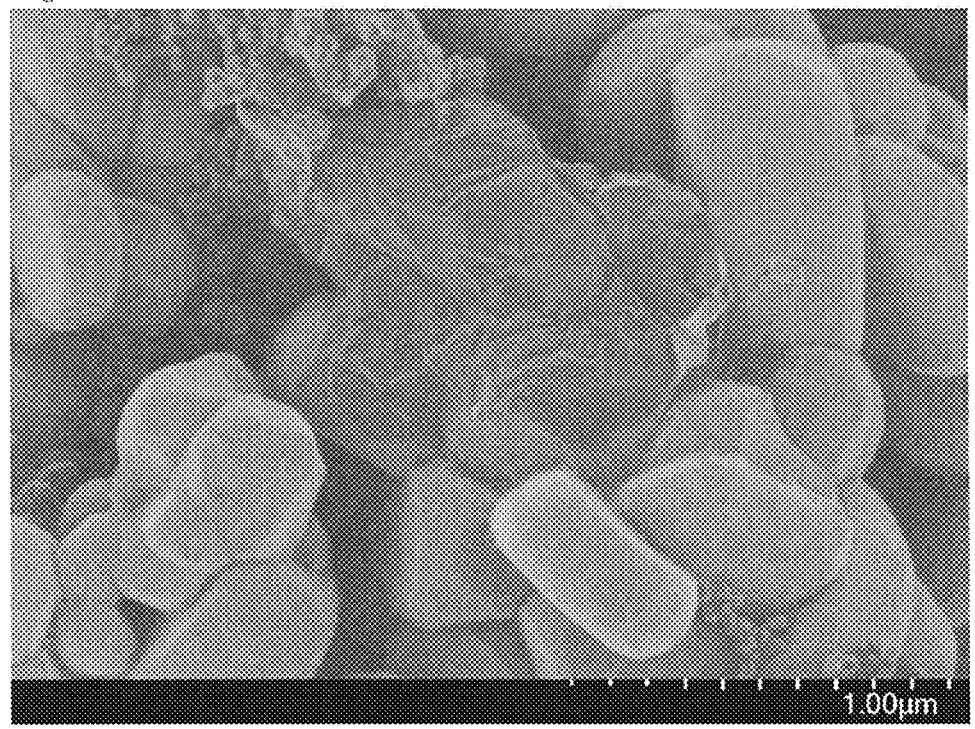
FIG. 4 is an example of an SEM image of lithium-transition metal composite oxide particles having a surface partially covered with the hole-doped graphene.

Lithium-transition metal composite oxide particles having a volume average particle diameter of 3 μm and a composition represented by a formula: $Li_{1.17}Ni_{0.33}Co_{0.33}Mn_{0.33}O_2$ were prepared in accordance with a known method. A positive electrode composition was obtained by mixing 97 parts by mass of the lithium-transition metal composite oxide, 0.25 parts by mass of the composition G, 1.75 parts by mass of acetylene black, and 1 part by mass of polyvinylidene fluoride (PVDF). An NMP slurry was prepared by mixing with N-methyl-2-pyrrolidone (NMP) such that the solid content concentration of the positive electrode composition was 52 mass %. The obtained NMP slurry was applied to an aluminum foil serving as a collector and dried to obtain a dry product. The dry product was compression-molded by a roll press and then cut into a predetermined size to fabricate a positive electrode of Example 1. The observation of the dry product with SEM (Hitachi High-Technologies SU8230; acceleration voltage: 0.5 KV) confirmed the presence of the electrode active material for a nonaqueous secondary battery in which the lithium-transition metal composite oxide particles were partially covered with graphene as shown in FIG. 4.

Comparative Example 1

A positive electrode of Comparative Example 1 was fabricated as in Example 1 except that the composition G was not used.

[Evaluation]

By using the positive electrodes obtained as described above, evaluation secondary batteries were fabricated in accordance with the following procedures.

(Fabrication of Negative Electrode)

A graphite material was used as a negative electrode active material. A negative electrode paste was prepared by kneading 97.5 parts by mass of the negative electrode active material, 1.5 parts by mass of carboxymethyl cellulose (CMC) and 1.0 part by mass of styrene butadiene rubber (SBR) dispersed in water. This paste was applied to a collector made of copper foil, dried, compression-molded by a roll press after drying, and then cut into a predetermined size to fabricate a negative electrode.

(Fabrication of Evaluation Secondary Battery)

After respective lead electrodes were attached to the collectors of the positive and negative electrodes, a separator was arranged between the positive and negative electrodes, and the separator and the electrodes were placed in a bag-shaped laminate pack. This was then dried in a vacuum at 65° C. to remove water adsorbed in the members. Subsequently, an electrolytic solution was injected into the laminate pack under an argon atmosphere and sealed. The battery obtained in this way was placed in a constant temperature bath at 25° C. and aged with a weak current. The electrolytic solution used was prepared by mixing ethylene carbonate (EC) and methyl ethyl carbonate (MEC) at a volume ratio of 3:7 and dissolving lithium hexafluorophosphate ($LiPF_6$) to the concentration of 1 mol/l.

(Charge/Discharge Test)

The output characteristics of the evaluation batteries obtained as described above were evaluated as follows.

(Output Characteristics)

Under an environment of 25° C., constant-current charge to a charge depth of 50% with a full-charge voltage set to 4.2 V was followed by pulse charge/discharge with a specific current value i. Ten seconds of pulse application was followed by 3 minutes of opening so that discharge and charge were sequentially repeated. The current values i of the pulse discharge/charge were 0.04 A, 0.08 A, 0.12 A, 0.16 A, and 0.20 A. By plotting the current value i on a horizontal axis of a graph and plotting a voltage value V after 10 seconds of pulse discharge on a vertical axis of the graph, an absolute value of a slope is obtained in a current range in which a straight line shape is maintained in the i-V plot and is defined as a battery resistance R(25) (Ω). The evaluation result is shown in Table 1.

TABLE 1

|  | R(25)/Ω |
| --- | --- |
| Example 1 | 1.24 |
| Comparative Example 1 | 1.34 |

From Table 1, it can be seen that by forming a secondary battery using the electrode active material for a nonaqueous secondary battery in which the surface is partially covered with the hole-doped graphene, the secondary battery is reduced in internal resistance and improved in output characteristics.

Example 2

Figure 5:
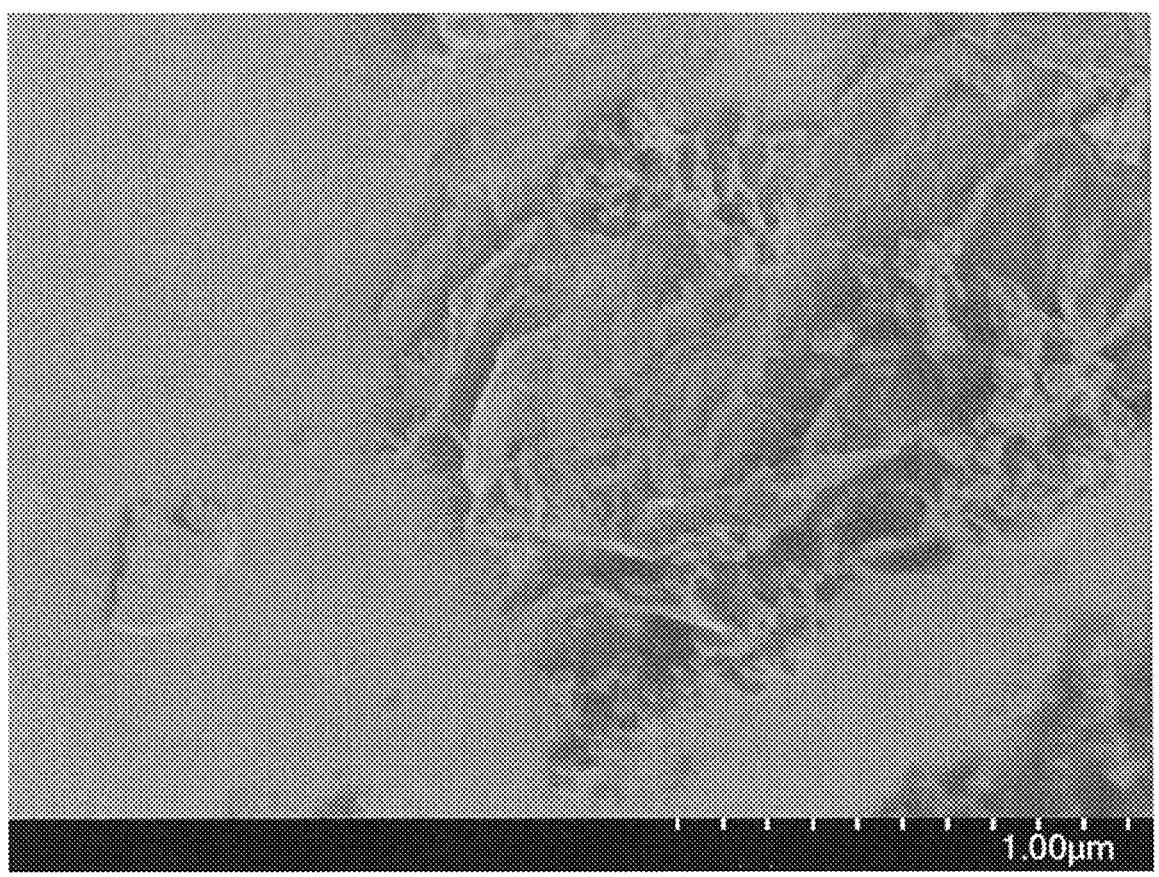
FIG. 5 is another example of an SEM image of the lithium-transition metal composite oxide particles having a surface partially covered with the hole-doped graphene.

A positive electrode of Example 2 was fabricated as in Example 1 except that lithium-transition metal composite oxide particles having a volume average particle diameter of 26 μm and represented by a composition formula: $LiCoO_2$ were prepared and used in accordance with a known method. The SEM observation of the dry product after application and drying of the NMP slurry as in Example 1 the presence of the electrode active material for a nonaqueous secondary battery in which the lithium-transition metal composite oxide particle surface was partially covered with graphene as shown in FIG. 5.

Comparative Example 2

A positive electrode of Comparative Example 2 was fabricated as in Example 2 except that the composition G was not used.

(Charge/Discharge Test)

The output characteristics were evaluated as in the above description except that the positive electrode obtained as described above was used. The evaluation result is shown in Table 2.

TABLE 2

|  | R(25)/Ω |
| --- | --- |
| Example 2 | 4.56 |
| Comparative Example 2 | 4.76 |

From Table 2, it can be seen that by forming a secondary battery using the electrode active material for a nonaqueous secondary battery in which the surface is partially covered with the hole-doped graphene, the secondary battery is reduced in internal resistance and improved in output characteristics.

The disclosure of Japanese Patent Application No. 2017-150815 (filed on Aug. 3, 2017) is hereby incorporated by reference in its entirety. All the documents, patent applications, and technical standards described in this description are hereby incorporated by reference to the same extent as if each of the documents, patent applications, and technical standards is specifically and individually described as being incorporated by reference.

What is claimed is:

1. An electrode active material for a nonaqueous secondary battery comprising: an alkali metal-transition metal composite oxide particle and a hole-doped graphene with an anion.

2. The electrode active material for a nonaqueous secondary battery according to claim 1, wherein the anion comprises at least one selected from the group consisting of fluorine-based anions and carborane derivatives.

3. An electrode composition for a nonaqueous secondary battery comprising: the electrode active material for a nonaqueous secondary battery according to claim 1.

4. An electrode composition for a nonaqueous secondary battery comprising: the electrode active material for a nonaqueous secondary battery according to claim 2.

5. An electrode for a nonaqueous secondary battery comprising: the electrode active material for a nonaqueous secondary battery according to claim 1.

6. An electrode for a nonaqueous secondary battery comprising: the electrode active material for a nonaqueous secondary battery according to claim 2.

7. A nonaqueous secondary battery comprising: the electrode for a nonaqueous secondary battery according to claim 5.

8. A nonaqueous secondary battery comprising: the electrode for a nonaqueous secondary battery according to claim 6.

9. A method for manufacturing an electrode active material for a nonaqueous secondary battery comprising:
  obtaining a hole-doped graphene by bringing a graphene raw material into contact with a two-coordinate boron cation; and
  bringing the hole-doped graphene into contact with an alkali metal-transition metal composite oxide particle.

10. The method for manufacturing according to claim 9, wherein the two-coordinate boron cation has an aromatic ring.

11. The method for manufacturing according to claim 9, wherein the two-coordinate boron cation is derived from a two-coordinate boron cation salt containing an anion, and wherein the anion comprises at least one selected from the group consisting of fluorine-based anions and carborane derivatives.

12. The method for manufacturing according to claim 10, wherein the two-coordinate boron cation is derived from a two-coordinate boron cation salt containing an anion, and wherein the anion comprises at least one selected from the group consisting of fluorine-based anions and carborane derivatives.

* * * * *